United States Patent [19]

Csipkes et al.

[11] Patent Number: 5,778,132
[45] Date of Patent: Jul. 7, 1998

[54] MODULAR OPTICAL AMPLIFIER AND CASSETTE SYSTEM

[75] Inventors: Andrei Csipkes, Columbia; Henry H. Yaffe, Reisterstown, both of Md.

[73] Assignee: Ciena Corporation, Linthicum, Md.

[21] Appl. No.: 784,909

[22] Filed: Jan. 16, 1997

[51] Int. Cl.$^6$ .............................. G02B 6/00; G02B 6/36
[52] U.S. Cl. ................................ 385/135; 359/341
[58] Field of Search ........................ 359/341, 180, 359/181, 333, 173, 179, 174, 345; 372/19, 23, 27, 31, 64, 68, 69, 96, 102, 6, 20, 70; 385/135, 136, 147, 134

[56] References Cited

U.S. PATENT DOCUMENTS

| | | | |
|---|---|---|---|
| 4,962,995 | 10/1990 | Andrews et al. | 359/341 |
| 5,241,414 | 8/1993 | Giles et al. | 359/341 |
| 5,253,104 | 10/1993 | Delavaux | 359/341 |
| 5,383,051 | 1/1995 | Delrosso et al. | 359/341 |
| 5,457,763 | 10/1995 | Kerry et al. | 385/135 |
| 5,504,771 | 4/1996 | Vahala et al. | 372/60 |
| 5,515,200 | 5/1996 | Delrosso et al. | 359/341 |
| 5,572,617 | 11/1996 | Bernhardt et al. | 385/135 |
| 5,577,151 | 11/1996 | Hoffer | 385/135 |
| 5,657,153 | 8/1997 | Endriz et al. | 359/341 |

*Primary Examiner*—Akm E. Ullah
*Attorney, Agent, or Firm*—Margaret Burke

[57] ABSTRACT

The present invention provides modular optical amplifier constituents suitable for constructing optical amplifiers of various designs and modular fiber optic cassettes. Each stage of a multiple stage optical amplifier is housed in a separate optical cassette. Optical pump(s) are separately packaged in pump modules to further simplify amplifier design and enhance amplifier manufacturability. In an exemplary embodiment, a modular optical amplifier is constructed comprising a first amplifier housing including a first optical cassette for holding a first amplifier stage. Cassette regions are provided for receiving one or more passive optical components used with the first stage of the optical amplifier. A first length of rare-earth doped optical fiber is retained by cassette retaining projections and optically communicates with a pump interconnection element. A second amplifier housing is provided comprising a second optical cassette for holding a second amplifier stage in a substantially similar manner as the first optical cassette. At least one optical pump is retained in an optical pump housing separate from the first and second optical cassettes for supplying pump energy to the optical amplifier. The cassettes are optionally mounted vertically or adjacent one another on a circuit board. The circuit board may include electrical circuits for monitoring amplifier performance and for passing the monitoring information to a network management system.

16 Claims, 12 Drawing Sheets

5,778,132

MODULAR OPTICAL AMPLIFIER AND CASSETTE SYSTEM

FIELD OF THE INVENTION

The present invention relates to modular optical amplifiers and modular fiber optic cassette systems useful in optical communication systems and, more particularly, to modular optical amplifier constituents comprising individual amplifier stages, each stage separately housed in a fiber optic cassette.

BACKGROUND OF THE INVENTION

Optical communication systems are a substantial and fast-growing constituent of communication networks. As used here, the term "optical communication system" relates to any system which uses optical signals to convey information across an optical waveguiding medium. Such optical systems include, but are not limited to, telecommunications systems, cable television systems, and local area networks (LANs). Optical systems are described in Gowar, Ed. *Optical Communication Systems*, (Prentice Hall, N.Y.) c. 1993, the disclosure of which is incorporated herein by reference. Currently, the majority of optical communication systems are configured to carry an optical channel of a single wavelength over one or more optical waveguides. To convey information from plural sources, time-division multiplexing (TDM) is frequently employed. In time-division multiplexing, a particular time slot is assigned to each information source, the complete signal being constructed from the signal portions created for each time slot. While this is a useful technique for carrying plural information sources on a single channel, its capacity is limited by the response time of the electronic and the lasers and detectors needed to generate and detect the required optical pulses.

While the need for communication services increases, the current capacity of existing waveguiding media is limited. Although capacity may be expanded, e.g., by laying more fiber optic cables, the cost of such expansion is prohibitive. Consequently, there exists a need for a cost-effective way to increase the capacity of existing optical waveguides. Wavelength division multiplexing (WDM) is one technique for increasing the capacity of existing fiber optic networks. A WDM system employs plural optical signal channels, each channel being assigned a particular channel wavelength. In a WDM system, signal channels are generated, multiplexed, and transmitted over a waveguide. At the receiving end, the optical signal is demultiplexed such that each channel wavelength is individually routed to a designated receiver. Exemplary WDM optical communication systems are described in commonly-assigned U.S. Pat. Nos. 5,504,609, 5,532,864, 5,557,439, the disclosures of which are incorporated by reference herein Optical amplifiers are an integral part of wavelength division multiplexed optical communication systems (although it is understood that optical amplifiers can also be used in conventional, single channel optical communication systems). Through the use of optical amplifiers, such as doped fiber amplifiers, plural optical channels are directly amplified simultaneously, facilitating the use of WDM systems in long-distance optical systems. Doped fiber optical amplifiers, such as erbium doped fiber amplifiers (EDFAs) typically include more than one stage of gain media (erbium or other doped fiber) with various optical components positioned in sequence before and after each amplifier stage. Manufacture of complex optical devices such as compound amplifiers is arduous and labor-intensive. Because the manufacture of EDFAs typically requires interconnecting the optical components and sections of doped fiber in serial fashion, many points of failure are possible, each failure point being difficult to troubleshoot.

One approach for reducing the size and complexity of optical amplifiers is discussed in U.S. Pat. No. 5,515,200. In this patent, both stages of an optical amplifier are packaged on drums contained within a single organizer frame which also includes the active (e.g., laser) and passive (e.g., optical isolator) optical components used in the amplifier. Although this amplifier design permits size reduction of the amplifier, the organizer frame with its optical components is still complex. Because many optical components, with their attendant splices, are packaged in a single frame, a bad component or splice destines an entire amplifier to rejection or extensive troubleshooting for repair. Further, the packaging of optical pump lasers within the amplifier housing itself increases the need for passive and/or active heat dissipation means for the optical amplifier. Because the service lifetime of the pump laser is less than the service lifetime of the passive optical components within the amplifier, the packaging of the pump laser with the optical amplifier requires that the entire amplifier be taken out of service at the end of laser lifetime, rather than just the optical pump. Additionally, pump laser packaging with the amplifier decreases amplifier design flexibility, since only the pump wavelength packaged with the doped fiber can be used to pump the amplifier.

There is a need in the art for improved optical amplifier packages which simplify amplifier manufacture, increasing product yields. There is a further need in the art for amplifier package designs compatible with modular optical systems. Additionally, a need exists for modular fiber optic cassettes to support such optical package designs. Such optical amplifier packages would permit flexible optical system, optical amplifier, and optical circuit construction through simple amplifier constituent units or optical functional units which can be organized into a number of device configurations.

SUMMARY OF THE INVENTION

The present invention provides modular optical amplifier constituents suitable for constructing optical amplifiers of various designs. Each stage of a multiple stage optical amplifier is housed in a separate optical cassette. Optical pump(s) are separately packaged in pump modules to further simplify amplifier design and enhance amplifier manufacturability. In an exemplary embodiment, a modular optical amplifier is constructed comprising a first amplifier housing including a first optical cassette for holding a first amplifier stage. The first cassette includes retaining projections for retaining a first length of rare-earth doped optical amplifier used in the first amplifier stage. Cassette regions are provided for receiving one or more passive optical components used with the first stage of the optical amplifier. A first length of rare-earth doped optical fiber is retained by the retaining projections and optically communicates with a pump interconnection element for allowing optical pump energy to pass into the rare-earth doped optical fiber.

A second amplifier housing is provided comprising a second optical cassette for holding a second amplifier stage. The second cassette includes retaining projections for retaining a second length of rare-earth doped optical amplifier used in the second amplifier stage. Cassette regions are provided for receiving one or more passive optical components used with the second stage of the optical amplifier. A second length of rare-earth doped optical fiber is retained by the retaining projections and optically communicates with a pump interconnection element for allowing optical pump energy to pass into the rare-earth doped optical fiber.

At least one optical pump is retained in an optical pump housing separate from the first and second optical cassettes for supplying pump energy to the optical amplifier. Optionally, a third amplifier cassette is provided for housing optical components positioned between the first and second stages of the optical amplifier. Such components may include optical isolators, optical power taps, and optical add/drop multiplexers. The resultant cassettes are optionally mounted vertically or adjacent one another on a circuit board. The circuit board may include electrical circuits for monitoring amplifier performance and for passing the monitoring information to a network management system.

In another aspect, the present invention provides a modular fiber optic cassette system for the retention and organization of optical fiber. The modular fiber optic cassette system comprises a first fiber optic cassette having a horizontal base and generally vertically projecting sidewalls. At least one sidewall is provided with a channel which intersects a through-hole in the horizontal base of the first cassette. Similarly, a second fiber optic cassette is provided having a horizontal base and generally vertically projecting sidewalls. As with the first cassette, at least one sidewall includes a channel which intersects a through-hole in the horizontal base. The assembly of the first and second cassettes provides an internal passage for receiving optical fiber passing between the first and second cassettes.

DETAILED DESCRIPTION

Figure 1:
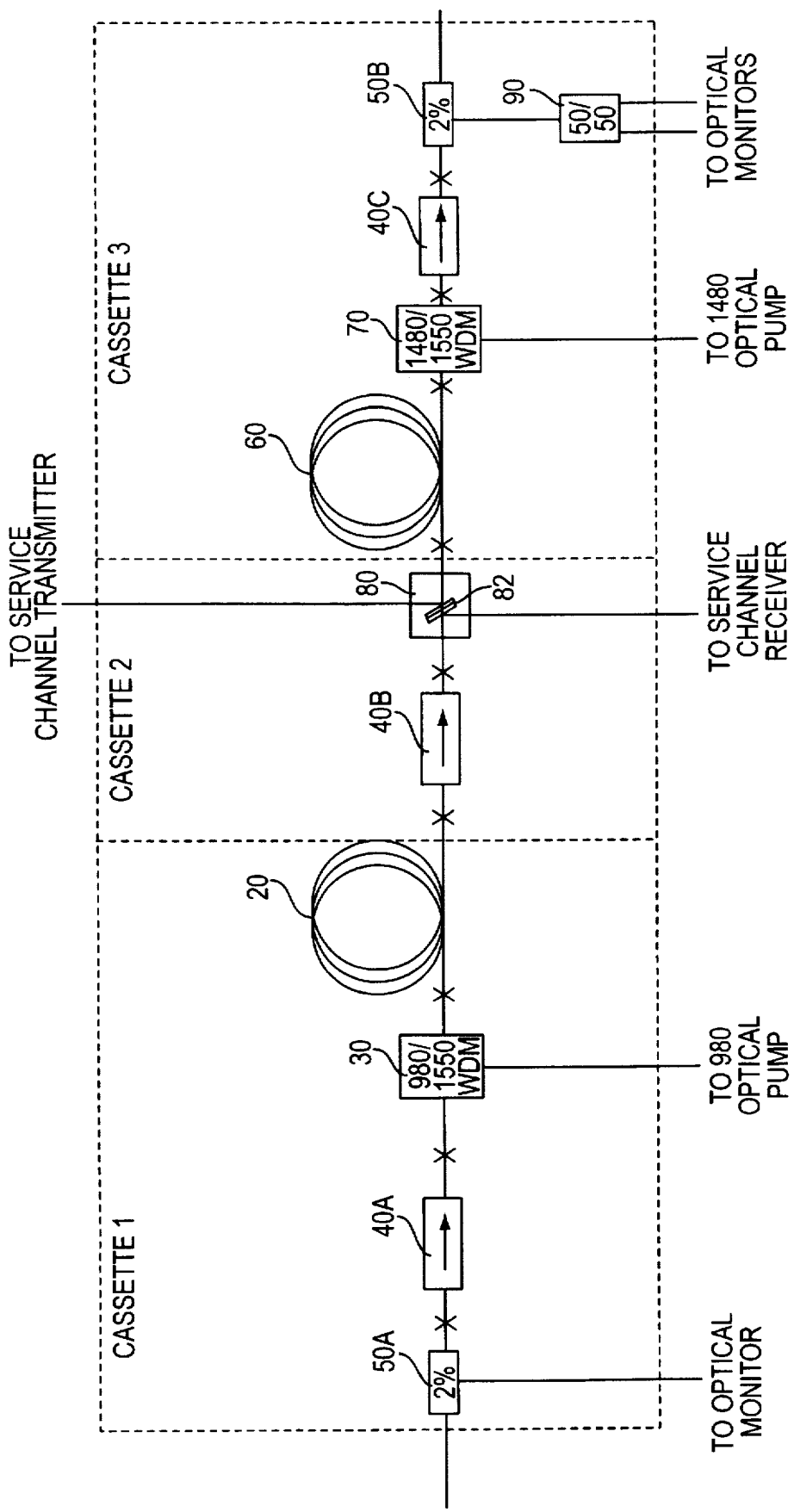
FIG. 1 is a schematic representation of an optical amplifier to be constructed in accordance with the modular optical cassettes of the present invention.

Turning to the drawings in detail in which like numerals indicate the same or similar elements in each of the several views, FIG. 1 schematically depicts an optical amplifier configuration 10 which will be used to demonstrate the principles of the modular optical amplifier system of the present invention. Optical amplifier 10 comprises first and second stages 20 and 60 selected from optical waveguides doped with a material which can produce optical gain in the waveguide. Such materials include rare earth dopants such as erbium, neodymium, praseodymium, ytterbium, or mixtures thereof. Pumping of the doped waveguide at a specific pump wavelength causes population inversion among the electron energy levels of the dopant, producing optical amplification of the wavelength division multiplexed optical signals. For doped fiber amplifiers employing erbium as the dopant, a wavelength band between approximately 1500 nm and approximately 1590 nm provides gain to optical signals when the doped fiber is pumped.

To supply the amplifier stages with pump energy, connecting elements 30 and 70 are provided. These are typically wavelength selective multiplexers which permit pump radiation to enter the doped fiber sections without allowing transmission channel radiation to pass into the pump. The connecting elements optically communicate with optical pumps (not shown). The optical pumps are generally selected from 980 and 1480 nm laser sources. In one embodiment, a 980 nm laser is used to pump the first stage of the amplifier while a 1480 nm laser is used to pump the second stage of the amplifier. To increase the gain in the second stage of the amplifier, light from the 980 pump can be used to pump both the first and second stages of the amplifier while the 1480 pump is simultaneously used to pump the second stage of the amplifier.

Optical isolators 40A, 40B and 40C are respectively positioned before the first stage, between the first and second amplifier stages, and following the second stage of the optical amplifier. Optical isolators prevent backscattered radiation from travelling upstream in the optical system. Optical isolators positioned between the stages of multiple-stage optical amplifiers improve amplifier performance by preventing second stage amplified spontaneous emission (ASE) from reaching the first stage of the optical amplifier. Note that each "x" depicted along the fiber transmission path indicates an optical splice or other interconnection element between adjacent amplifier constituents.

Optionally, optical taps 50A and 50B are positioned before the first amplifier stage and following the second amplifier stage for monitoring amplifier performance. Optical tap 15B is further divided into two optical streams by 50:50 optical splitter 90. When the optical amplifier is employed in an optical communication system which employs an optical service channel, the optical service channel may be optionally inserted and removed between the two amplifier stages through the use of four-port wavelength division multiplexer 80 The amplifier stages are interconnected through interconnection element 80, selected to be a four-port wavelength division multiplexer. Multiplexer 80 includes at least one wavelength selective member 82, such as a multilayer interference filter, for selecting one or more optical service channels to enter and exit the communication system. For the amplifier of FIG. 1, a service channel wavelength of 1625 nm is selected. This wavelength is outside the gain band of the erbium-doped optical fiber, ensuring survival of the service channel in the event of an optical pump failure. Further description of the positioning of service channel add/drop elements between the stages of an optical amplifier are described in commonly-assigned U.S. Pat. No. 5,532,864, incorporated by reference above. Additionally or alternatively, an add-drop multiplexer, such as that disclosed in co-pending, commonly assigned U.S. patent application Ser. No. 08/784,909, (Attorney Docket No. 119mab), may be optionally positioned between the stages of the optical amplifier.

As depicted in FIG. 1, each optical amplifier stage is positioned in a separate cassette. To further simplify amplifier manufacture, the components located between the two amplifier stages are themselves positioned in a separate cassette. Although the three-cassette implementation decreases the complexity of individual amplifier cassettes, the only requirement of the modular amplifiers constructed in accordance with the present invention is that each amplifier stage be housed in a separate cassette. Consequently, it is understood that the components positioned between the amplifier stages can be located in either of the two amplifier stage cassettes or divided between the two cassettes. It is further understood that the optical amplifier schematically depicted in FIG. 1 is merely exemplary. Further descriptions of optical amplifiers suitable for construction in accordance with the modular cassette system of the present invention are found in commonly-assigned, copending U.S. patent application Ser. No. 08/554,976 (Attorney Docket No. 106mab), Gowar, Ed. *Optical Communication Systems*, Bjarklev, *Optical Fiber Amplifiers: Design and System Applications*, (Artech House, Norwood, Mass.), c. 1993, and Desurvire, *Erbium-Doped Fiber Amplifiers*, (John Wiley & Sons, Inc., N.Y.), c. 1994, the disclosures of which are incorporated herein by reference.

Figure 2:
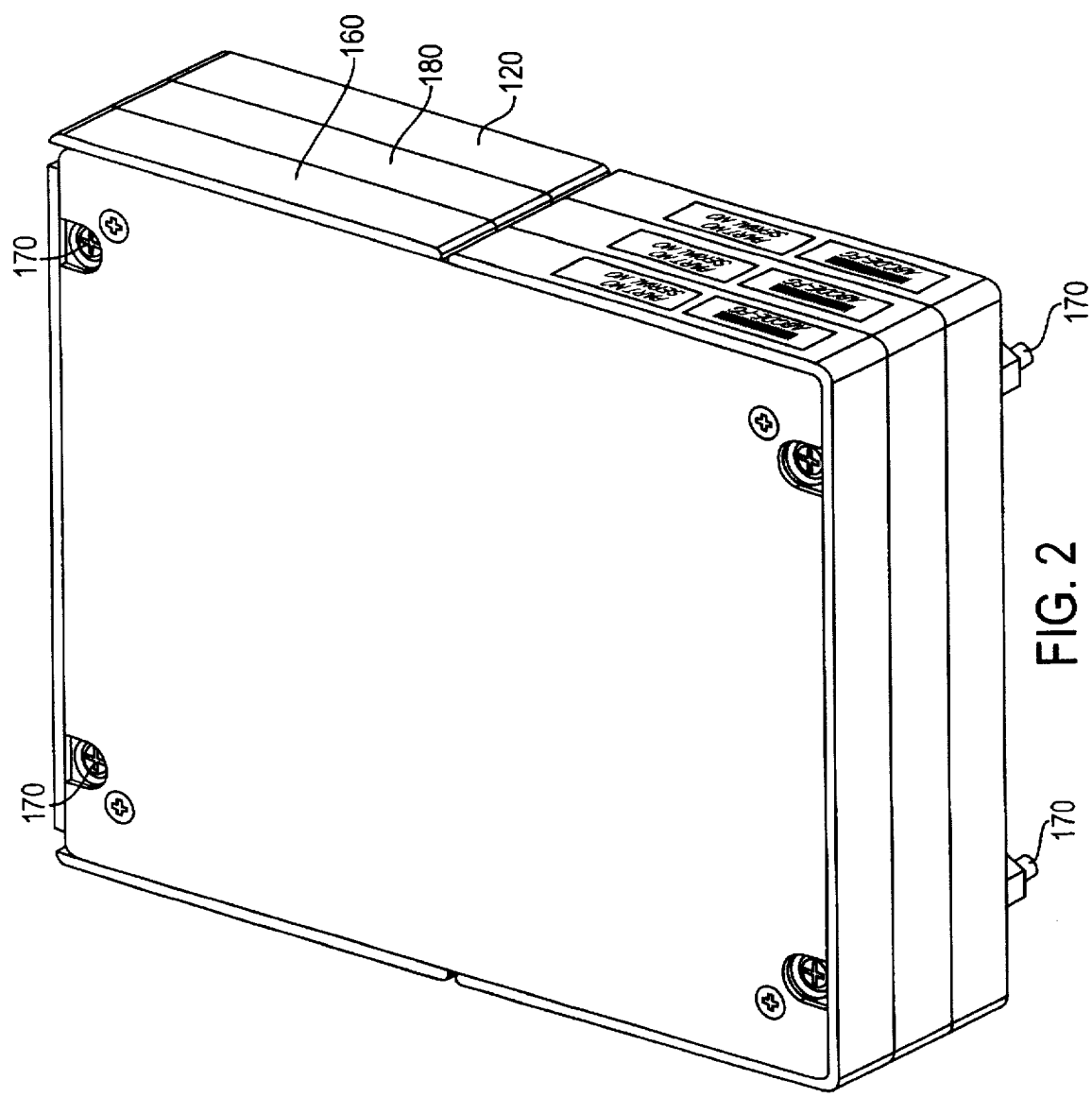
FIG. 2 is a perspective view of an optical amplifier arrangement comprising three vertically-stacked amplifier cassettes according to one embodiment of the present invention.

FIG. 2 depicts an optical amplifier module 100 for assembling the optical amplifier of FIG. 1 in accordance with one embodiment of the present invention. Amplifier module 100 includes first, second, and third amplifier cassettes 120, 180, and 160 which respectively house first amplifier stage 20, interstage components 80, 40B, and second amplifier stage 60. Amplifier module 100 is retained in a compact, vertically-stacked arrangement by fasteners 170 which engage through holes positioned in the corners of each cassette (best seen in FIG. 3).

Figure 3:
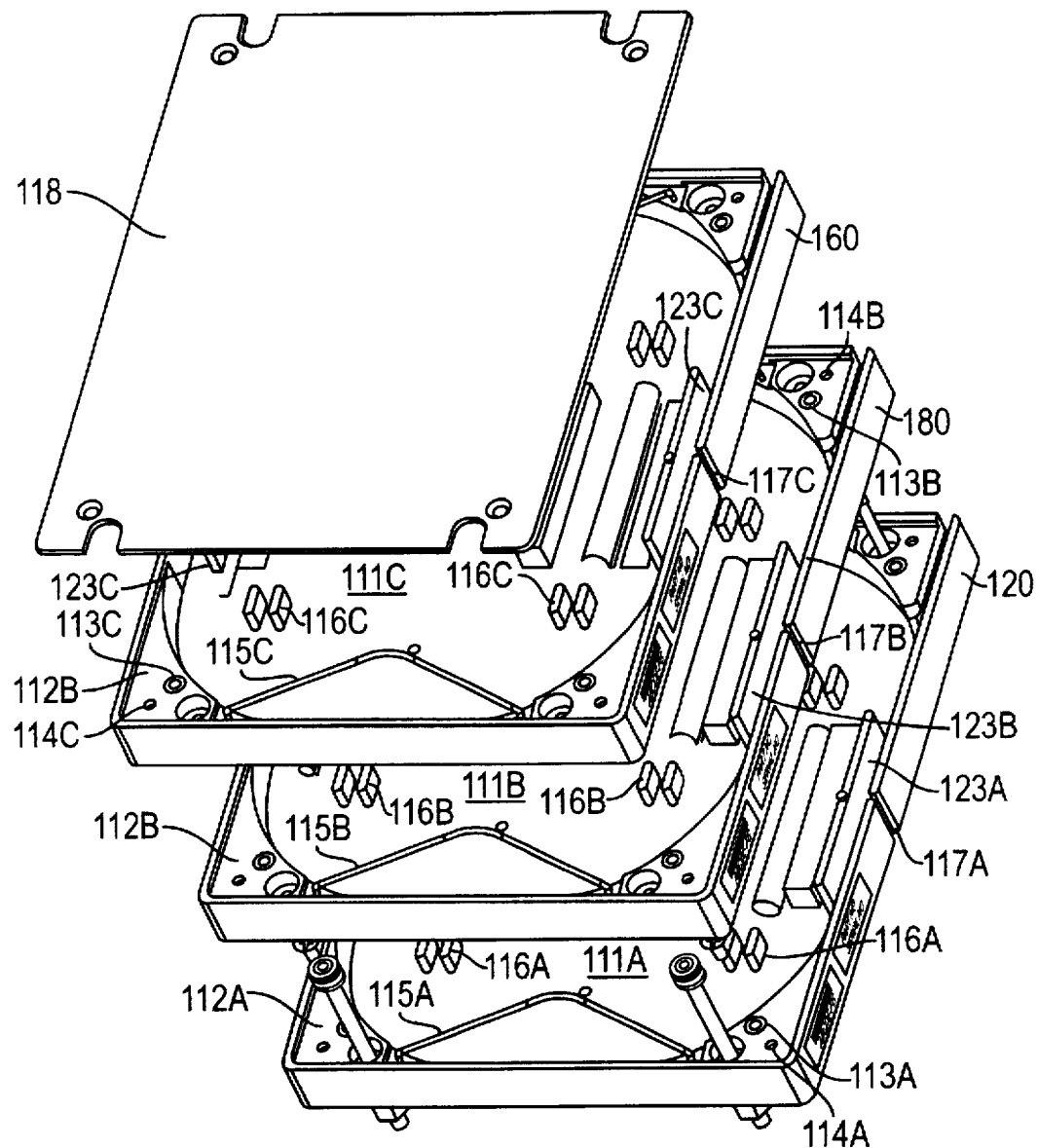
FIG. 3 is a perspective view with parts separated of the vertically-stacked amplifier cassettes of FIG. 2.

FIG. 3 depicts the amplifier module of FIG. 2 with parts separated (but without optical fiber and optical components) to illustrate cassette construction and interengagement with adjacent cassettes. As seen in FIG. 3, each cassette includes a flat, tray-like base 111A, B, C, for receiving optical components and optical fiber. Cassette walls 112A, B, C define an interior curved surface which corresponds to a permissible bend radius for the optical fiber employed in the amplifier. A pair of retaining walls 123A, B, and C in each cassette (top walls are shown in FIG. 3, bottom wall 123C is depicted in cassette 160) define an outer track for fiber retention against the interior cassette walls and additionally serve to separate the fiber from other optical components within the cassette. Fiber retaining clips 115A, B, C extend from the cassette walls to assist in fiber guidance and organization within the cassette. Fiber guiding projections 116A, B, and C extend from the base of the cassette for directing the fiber toward the fiber retaining clips to further aid in fiber organization within the cassette, particularly for fibers which extend to or from optical components placed within the cassette. To maintain fiber placement between the fiber guiding projections, resilient fiber retainers such as sponges (not shown) may be placed between the fiber guiding projections to hold the fiber between the projections. The configuration of the optical cassettes permits fiber to be wound within the cassette or, alternatively, pre-spooled fiber may be placed within the cassette and under the fiber retaining clips.

It is noted that although fiber projections 116 and retaining walls 123 are shown as being integrally formed with the cassette these elements can alternatively be detachable from the cassette base such that retaining/guiding elements can be attached to the cassette base during assembly of the optical device within the cassette. For example, guiding projections 116 could be snap-fit into mating holes or recesses within the cassette base or could be glued to the cassette base. Such detachable guiding/retaining projections may be desirable for example when using pre-wound fiber which is assembled simultaneously with the projections against the cassette base.

Wall channels 117A, B, C permit optical fibers from one cassette to pass to adjacent cassettes without the necessity of guiding fiber perpendicularly into through-holes within base plate. A second set of wall channels 117A, B, and C (best seen in FIGS. 4–6) is provided in the opposing cassette wall. Wall channels 117 intersect through-holes 122 (best seen in FIGS. 4–6) formed in cassette base 111. Through this configuration, discussed below, optical fiber guided into wall channels 117 passes in the through-holes 122 of the cassette base, permitting simple interconnection of fiber from adjacent cassette levels. Note that the vertical and horizontal configuration of the amplifier cassettes permits a sufficiently large bend radius for the fiber in both the vertical and horizontal directions. The edges of both the through-holes and the wall channels are rounded, preventing damage to the fibers which pass through the channels.

Cassette walls 112 further include projections 113A, B, C and recesses 114 A, B, C which interengage with adjacent cassette recesses and projections to interlock cassettes. Projections 113 include a central through hole for receiving a threaded fastener. Optionally, engagement/alignment pins (not shown) may be provided on the cassette base to interengage with recesses 114 to further assist in interlocking adjacent cassettes. Through this cassette interengagement, the base of one cassette forms a top wall for the adjacent cassette. A cassette cover plate 118 forms the final wall of the top cassette following assembly of the vertically-stacked array. It is important to note that although the amplifier cassettes are vertically stacked in the exemplary embodiment, the cassettes can be mounted horizontally, with each cassette being provided with a cover plate. Since the cassette layout is frequently dictated by overall optical system space constraints, the use of modular amplifier cassettes advantageously promotes overall design flexibility for an optical system and permits a variety of amplifier sizes and shapes. Additionally each cassette may correspond to a particular function within an optical system (e.g., stand-alone gain block, add-drop multiplexer, pre-amplifier, etc.) allowing custom system configurations with minimal re-tooling. It is noted that although the cassettes are depicted as having a rectangular shape other shapes are possible including square, circular, triangular, etc.

Figures 4, 4A:
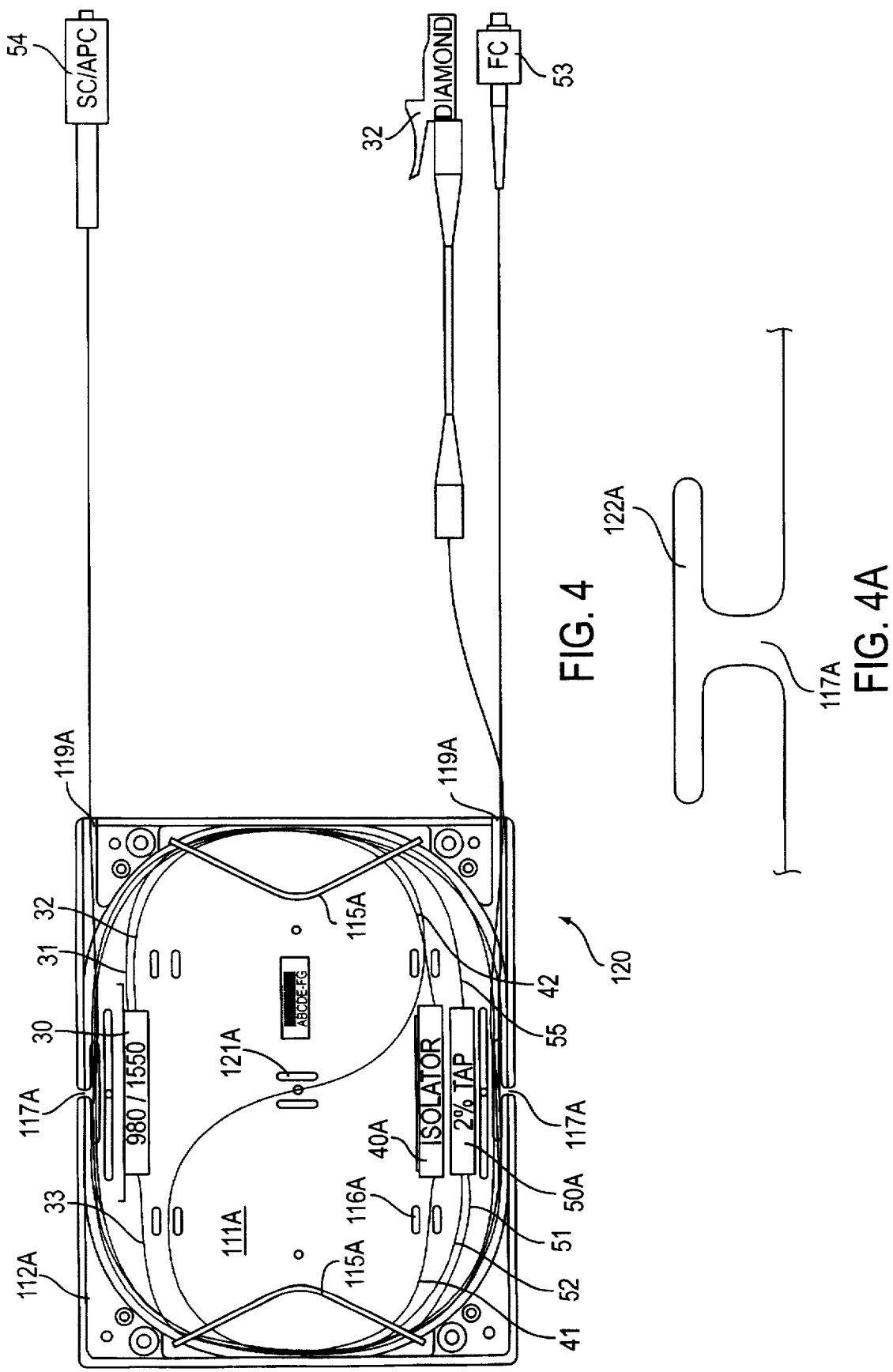
FIG. 4 is a top view of a first amplifier cassette holding the optical fiber and optical components for the first stage of a two stage optical amplifier according to the present invention.
FIG. 4A is an enlarged view of the intersection of the cassette wall channel and the cassette base through-hole.

The organization of individual cassette components will be described with reference to FIGS. 4, 5, and 6 which depict top views of the amplifier stage cassettes and the inter-stage component cassette. FIG. 4 depicts optical cassette 120 which includes first amplifier stage 20 as well as optical tap 50A, optical isolator 40A, and pump interconnection element 30. To enable system component modularity, optical connectors, rather than optical splices, are provided for interconnecting the optical amplifier with an optical transmission line and for interconnecting the optical amplifier with optical pumps. To this end, pigtail fibers 51 and 52 extending from 2% optical tap 50A and pigtail fiber 31 extending from 980/1550 WDM optical coupler 30 are connectorized prior to placement within amplifier cassette 120. Optical tap pigtail fiber 51 is provided with an FC/UPC connector 53, commercially available from Seiko Instruments, for connection with the optical system transmission path. Pigtail fiber 52 is provided with an SC/APC connector 54, commercially available from Molex, for connection with an optical monitor. 980/1550 WDM optical coupler pigtail fiber 31 is provided with a diamond E2000 connector 32, commercially available from Diamond Corp., for connection with a 980 optical pump. The 980 nm optical pump is housed in an optical package separate from the optical amplifier to enhance system modularity and to permit easy service and replacement of the pump laser when required.

The connectorized optical components are placed on cassette base 111A and retained in position through the use of a resilient adhesive such as RTV. Alternatively, the optical components can be held against the cassette base through the use of mechanical fasteners integrally formed with the cassette base or received into retaining slots formed in the base. The connectorized component pigtails are positioned outside the amplifier cassette by placing the pigtail fibers 51, 52, and 31 through fiber ports 119A. Excess pigtail fiber is looped around the interior cassette wall and passed under fiber retaining clips 115A. If insufficient fiber length is available for a complete fiber loop around the perimeter, the pigtail fiber is routed through central fiber guiding projections 121A and through guiding projections 116 to form an S-shaped fiber path each curve of which does not exceed the permissible bend radius of the optical fiber. Fibers are optionally retained between the guiding projections with resilient retainers such as anti-static sponges. It is noted that the various retaining means in the cassette (and in the vertical assembly of adjacent cassettes) enable only vertical and horizontal routing combinations having a 2.5 inch bend radius, a permissible bend radius for the fiber employed. In this manner, all fiber routing will result only in acceptable fiber curvature, ensuring proper operation of the resultant devices.

Figure 7A:
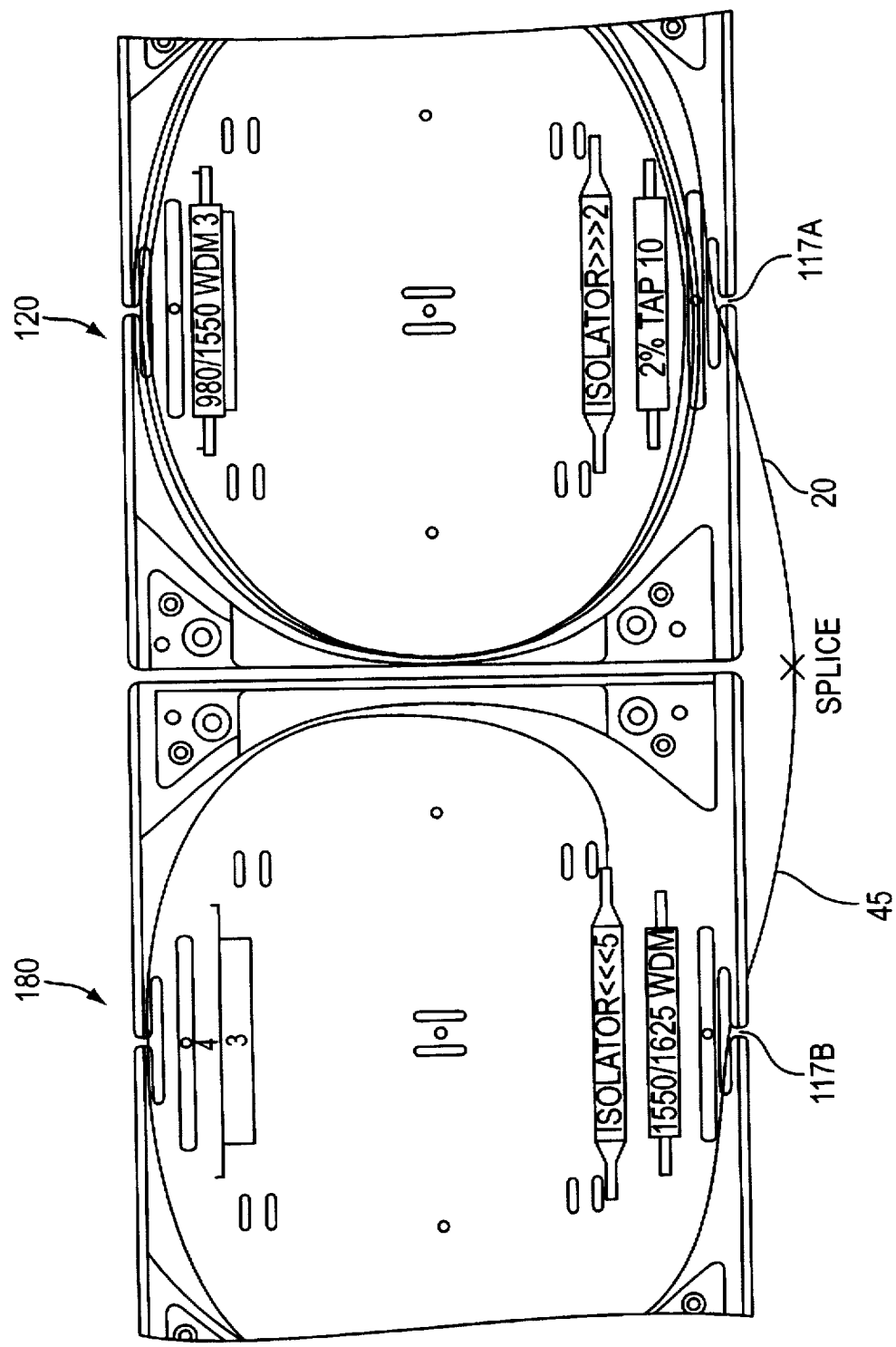
FIGS. 7A, 7B, and 7C depict steps in the assembly of the amplifier cassettes of FIGS. 4–6 into a vertically-stacked assembly.
Figure 7B:
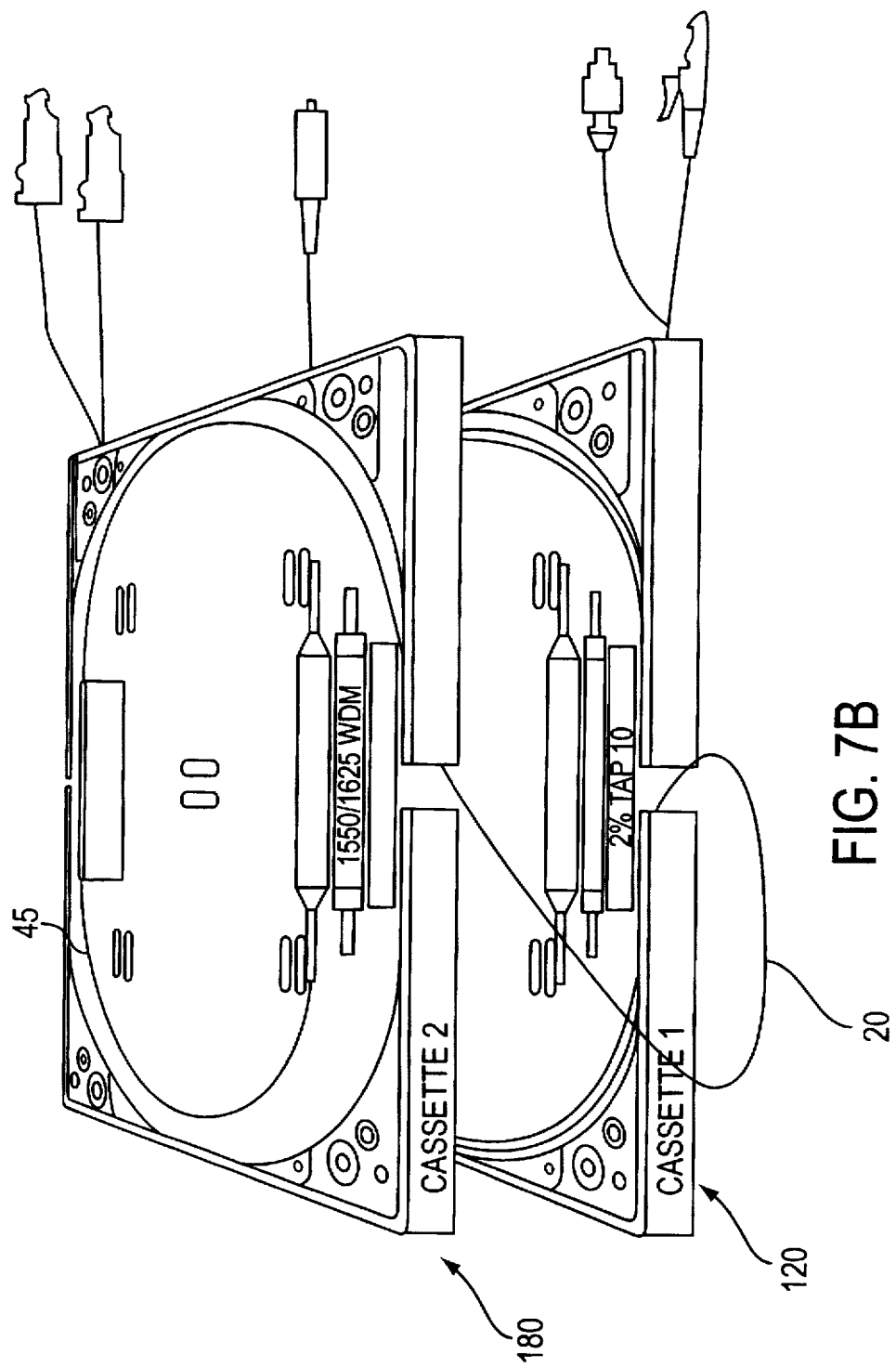
Figure 7C:
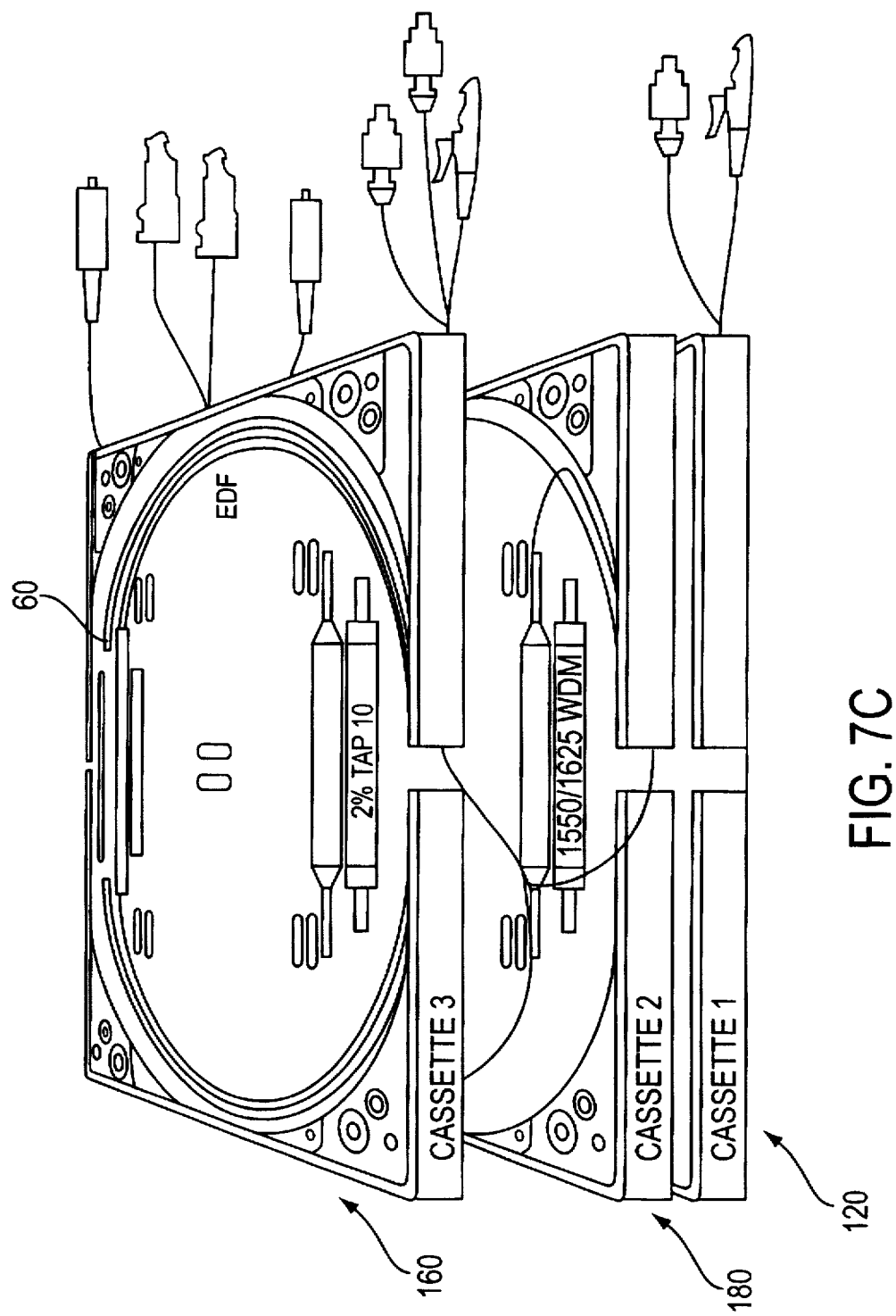

To create the optical amplifier of FIG. 1, the pigtail fiber 55 of 2% tap 50A and the pigtail fiber 41 of optical isolator 40A are spliced together. Similarly, pigtail fiber 42 of optical isolator 40A is spliced to pigtail fiber 32 of 980/1550 WDM optical coupler 30. The remaining pigtail fiber 33 of 980/1550 optical coupler 30 is spliced to the erbium fiber 20 which comprises the first stage of the optical amplifier. For clarity of presentation, erbium fiber 20 is not depicted in FIG. 4 but is shown in FIGS. 7A–7C where the assembly of cassettes 120, 160, and 180 is depicted. The unspliced end of the erbium fiber 20 is routed through one of wall channels 117A for later splicing to the pigtail fiber of optical isolator 40B.

It is noted that during construction of the optical cassette, the strength and optical power transmission of each optical splice (or other optical connection) is tested before moving on to the next optical splice in order to permit resplicing (if necessary) prior to connection with a further optical component. In this manner, the overall splice loss and power transmission for each optical cassette is determined prior to its assembly with other cassettes or into a device system. The determination of individual cassette performance permits uncomplicated troubleshooting within the individual cassette and facilitates rework of unacceptable cassettes before they are fabricated into a larger system.

Figure 5:
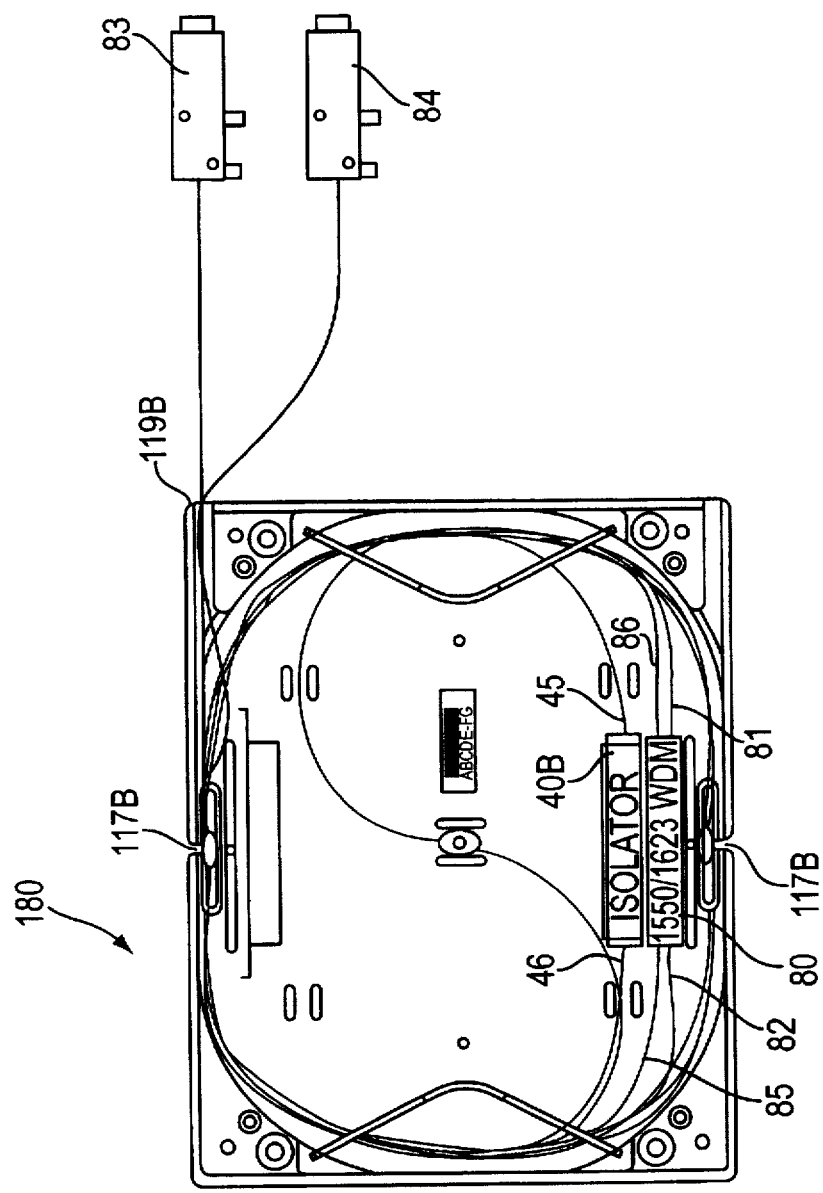
FIG. 5 is a top view of a second amplifier cassette with components used between the stages of a two stage optical amplifier.

FIG. 5 depicts amplifier cassette 180 for housing optical components positioned between the stages of the optical amplifier. As with amplifier cassette 120, optical components are connectorized or to positioning within the optical cassette. To this end, pigtail fibers 81 and 82 of 1550/1625 WDM coupler 80 are respectively provided with BSC connectors 83 and 84, commercially available from Molex. These connectors will couple the optical signal to and from a service channel modem for receiving and transmitting the optical service channel. As with the connectorized pigtail fibers in the first amplifier cassette, pigtail fibers 81 and 82 are retained in fiber port 119B to permit connector placement outside the amplifier cassette.

Optical isolator 40B includes pigtail fiber 45 for splicing to the erbium fiber from the first amplifier cassette (not depicted in this FIG. for clarity of presentation. The interconnection of the erbium fiber comprising the first and second stages and its routing between cassettes is depicted in FIGS. 7A–7C). A second isolator pigtail fiber 46 is routed around the optical cassette and spliced to 1550/1625 WDM coupler pigtail fiber 85. The last WDM pigtail fiber 86 will be spliced to the erbium fiber which forms the second stage of the optical amplifier.

Figure 6:
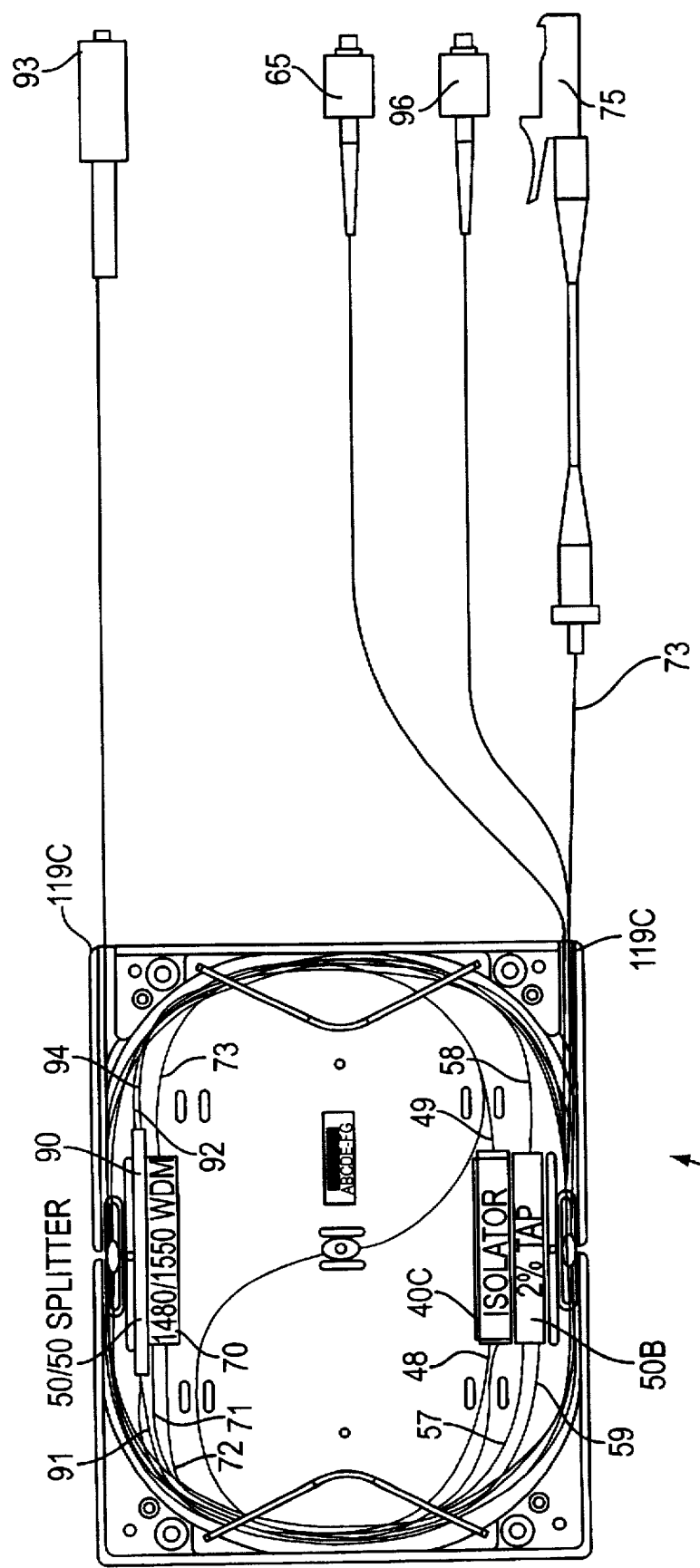
FIG. 6 is a top view of a third amplifier cassette holding the optical fiber and optical components for the second stage of a two stage optical amplifier.

FIG. 6 depicts the third optical amplifier cassette 160. Amplifier cassette 160 houses 1480/1550 WDM optical coupler 70, isolator 40C, 2% optical tap 50B and 50:50 optical splitter 90. As in the previous cassettes, each component is secured to the cassette base through adhesives. WDM optical coupler 70 includes pigtail fiber 71 for splicing to erbium fiber 60 (not shown) which forms the second stage of the optical amplifier. Pump energy from a 1480 pump (not shown) enters coupler 70 through second pigtail fiber 73 which is provided with Diamond connector 75. The amplified optical signal exits the 1480/1550 optical coupler through third pigtail fiber 72 which is spliced to input pigtail fiber 48 of isolator 40C. The output pigtail fiber 49 of isolator 40C is spliced to pigtail fiber 57 of optical tap 50B. The majority of the optical signal is output by the optical tap onto tap output pigtail 58 which is provided with FC connector 65 for interconnection with the primary optical transmission path of an optical system. The 2% portion of the optical signal is output onto optical tap output pigtail 59 which is spliced to pigtail fiber 91 of optical splitter 90. First splitter output pigtail 92 is provided with SC connector 93 for interconnection with an optical monitor for analyzing the amplifier performance. Second splitter output pigtail 94 is provided with FC connector 96 for routing a portion of the amplifier output signal to an external signal monitor (e.g., a customer spectrum analyzer or power monitor).

As discussed previously, the individual optical cassettes of FIGS. 4–6 can be assembled vertically to form a stacked cassette arrangement. The interconnection of the optical fibers between adjacent cassettes will be discussed with reference to this vertical assembly, depicted in FIGS. 7A–7C. However, it is understood that the interconnection of the fibers between the cassettes applies equally to cassettes formed into adjacent horizontal arrays (with cassette covers provided for each individual cassette). FIG. 7A shows the interconnection of the erbium fiber from the first cassette (cassette 120) to the second cassette. Erbium fiber 20 is spliced to pigtail fiber 33 of 980/1550 coupler 30 (not shown in FIG. 7A for clarity) at a first end and is spliced to pigtail fiber 45 of optical isolator 40B. The erbium fiber and the pigtail fiber are respectively routed through channels 117A and 117B of cassettes 120 and 180 where they pass into through-holes 122. Sufficient slack fiber is provided to allow the vertical assembly of the cassettes.

In FIG. 7B, cassette 180 is stacked upon cassette 120. As can be seen from the relative position of the pigtail fiber from isolator 40B in cassette 180, the cassettes are rotated during the stacking operation. This rotation relieves the stress produced in the fiber during the splicing operation.

Figure 8:
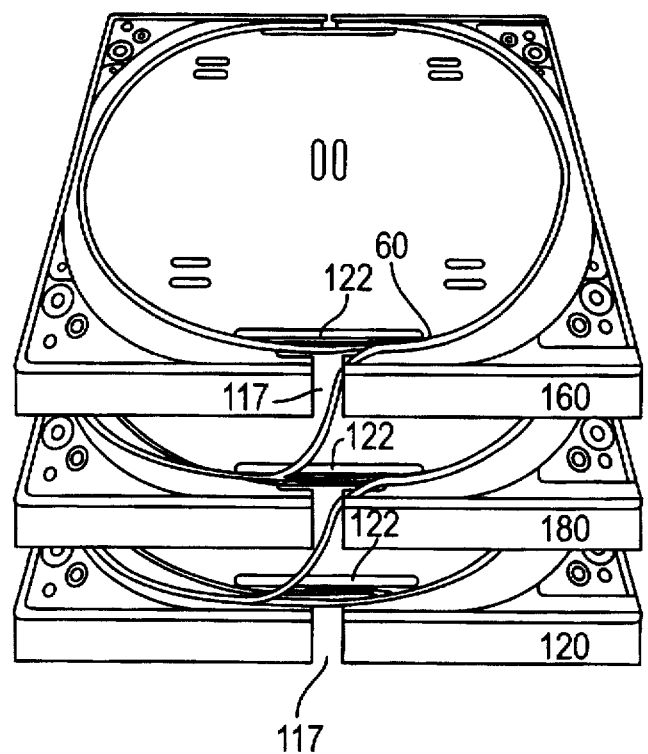
FIG. 8 is a side cut-away view of the vertically stacked assembly formed in FIG. 8 depicting the path of fiber between the levels through the internal channel formed by the assembly.

The slack fiber is taken up during the rotation to form at least a portion of a fiber loop within the second cassette. Following rotation and stacking, the fiber which straddles the two cassettes rises at an acute angle through the passage formed by through-holes 122. This gradual rise of the fiber between adjacent cassettes is best seen in FIG. 8. It is important to note that the intersection of wall channels 117 and through holes 122 permits the low-angle rise whereas through-holes alone subject interconnecting fiber to high angles as it passes between levels.

FIG. 7C depicts the addition of cassette 160 to the vertically-stacked array and the routing of the first and second stages of erbium fiber within the array. Erbium fiber 60 is spliced to pigtail fiber 71 of 1480/1550 WDM optical coupler in cassette 160 ( not shown for clarity); the unspliced end is routed through channel 117C where it is spliced to the pigtail fiber 86 from 1550/1625 WDM optical coupler 80. As with the assembly of cassettes 120 and 180, the assembly of cassettes 180 and 160 involves the rotation of the cassette 160 relative to cassette 180 to relieve the built in stress and take up the fiber slack.

Following the vertical assembly of cassettes 120, 180, and 160, the fibers pass through a vertical channel formed by vertically-stacked through holes 122, as shown in FIG. 8. Although the fibers passed through channels 117 during assembly, they are now completely retained internally within the interior vertical channel. The gradual rise of the fibers is within the permissible bend radius; thus the cassette design ensures both horizontal and vertical conformance with bend radius standards. After the vertical assembly of the cassettes, cover 118 is placed over cassette 180 and fasteners are inserted into the through-holes of wall projections 113 to retain the vertical cassette assembly.

Figure 9:
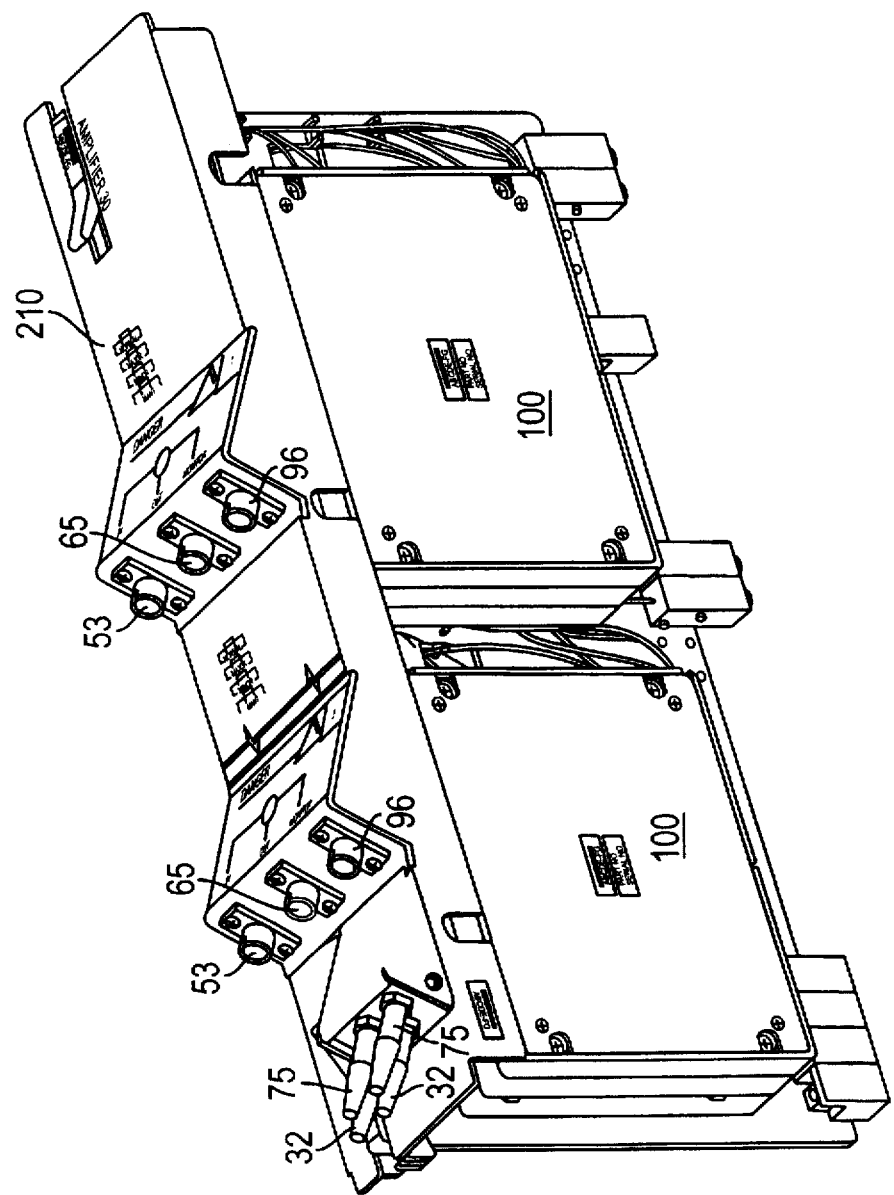
FIG. 9 is a perspective view of two triple cassette optical amplifier modules mounted on a circuit board and including mounted optical connectors.
Figure 10:
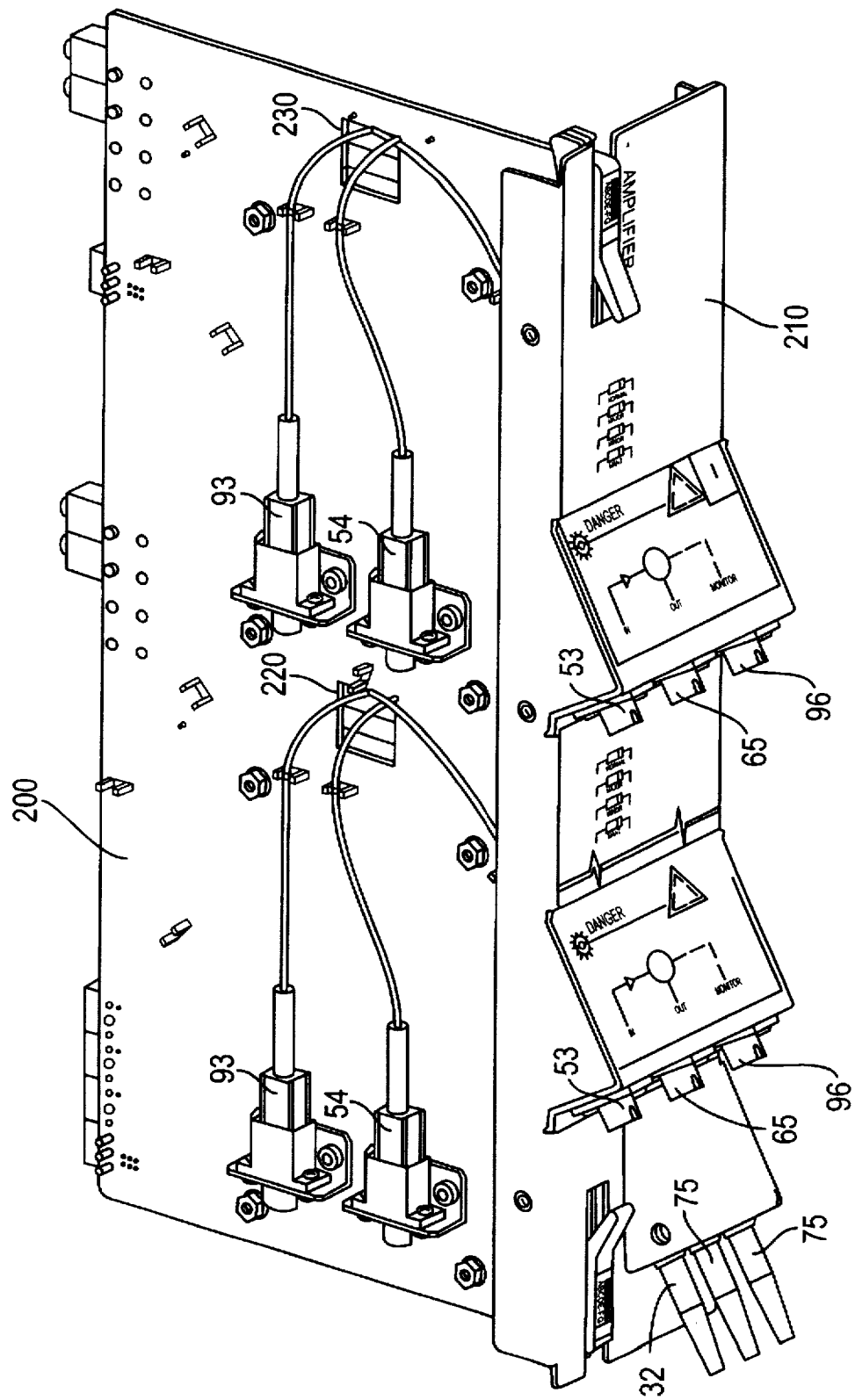
FIG. 10 is a perspective view of the opposite side of the mounted triple cassette modules of FIG. 9.

To permit the optical amplifier module 100 to be mounted in standard telecommunications racks and to provide a fixture for the various optical connectors, circuit board 200 is provided as depicted in FIGS. 9 and 10. As shown in FIG. 9, two amplifier modules 100 are mounted on circuit board 200. Each amplifier module amplifies signal traffic in a particular direction, west-east or east-west, within an optical communication system. Circuit board 200 interconnects with front cover 210 through which FC connectors 53, 65, and 96 project for respectively passing the WDM signal input, the amplified WDM signal output, and the optical monitoring WDM signal portion output. Diamond connectors 32 and 75 also project through the front cover for respectively interconnecting with the 980 and 1480 optical pumps. On the optical backplane, optical connectors 83 and 84 are mounted for interconnection with a service channel modem.

FIG. 10 depicts the reverse side of circuit board 200. As seen in FIG. 10, optical connectors 93 and 54 are pass through circuit board apertures 220 and 230. These connectors, which interconnect with optical taps 50A and 50B, are mounted adjacent optical monitors for measuring amplifier performance.

While the foregoing invention has been described in terms of the embodiments discussed above, numerous variations are possible. For example, the individual optical cassettes used to create a two-stage amplifier can also be used to create amplifiers having three or more stages. The compact design of the individual amplifier stages provides great flexibility in the cassette mounting in standard telecommunication rack systems, whether stacked in a horizontal or vertical array. Each individual cassette may correspond to a functional module within an optical system an can therefore be used individually at any given point in a system. The fiber optic cassettes can be used for various purposes besides optical amplifiers. Such applications include add/drop multiplexers, splice organizers, service channel insertion/ removal modules, circulator-based optical subsystems, optical circuits, and the like. Accordingly, modifications and changes such as those suggested above, but not limited thereto, are considered to be within the scope of following claims.

What is claimed is:

1. A modular optical amplifier comprising:

a first amplifier housing comprising a first optical cassette for holding a first stage of a multiple stage optical amplifier, the first cassette comprising retaining means for retaining a first length of rare-earth doped optical amplifier used in a first stage of the optical amplifier and cassette regions for receiving one or more passive optical components used with the first stage of the optical amplifier;

a first length of rare-earth doped optical fiber retained in said retaining means and first pump interconnection means optically communicating with the first length of rare-earth doped optical fiber for allowing optical pump energy to pass into the rare-earth doped optical fiber;

a second amplifier housing comprising a second optical cassette for holding a second stage of a multiple stage optical amplifier, the second cassette being separated from the first cassette by at least one cassette wall, the second cassette comprising retaining means for retaining a first length of rare-earth doped optical amplifier used in a second stage of the optical amplifier and second cassette regions for receiving one or more passive optical components used with the first stage of the optical amplifier;

a first length of rare-earth doped optical fiber retained in said retaining means and second pump interconnection means optically communicating with the first length of rare-earth doped optical fiber for allowing optical pump energy to pass into the rare-earth doped optical fiber;

at least a first optical pump retained in an optical pump housing separate from the first and second optical cassettes, the at least one optical pump optically communicating with at least the first pump interconnection means for optically pumping at least the first stage of the optical amplifier.

2. A modular optical amplifier as recited in claim 1 further comprising a second optical pump retained in an optical pump housing separate from the first and second optical cassettes, the second optical pump optically communicating with at least the second pump interconnection means for optically pumping at least the second stage of the optical amplifier.

3. A modular optical amplifier as recited in claim 1 further comprising a third optical cassette for housing optical components positioned between the first and second stages of the optical amplifier.

4. A modular optical amplifier as recited in claim 3 wherein an optical isolator is positioned in the third optical cassette.

5. A modular optical amplifier as recited in claim 3 wherein an add-drop multiplexer is positioned in the third optical cassette.

6. A modular optical amplifier as recited in claim 1 further comprising a circuit board upon which is mounted the first and second optical cassettes.

7. A modular optical amplifier as recited in claim 3 further comprising a circuit board upon which is mounted a vertically stacked array comprising the first, second, and third optical cassettes.

8. A modular optical amplifier as recited in claim 1 further comprising an optical isolator positioned in the first optical cassette and interconnected with the first length of rare-earth doped optical fiber such that the isolator is upstream of the optical fiber.

9. A modular optical amplifier as recited in claim 1 further comprising an optical isolator positioned in the second optical cassette and interconnected with the second length of rare-earth doped optical fiber such that the isolator is downstream of the optical fiber.

10. A modular optical amplifier comprising:

a first optical cassette housing a first amplifier stage which includes a first length of optical gain medium;

a second optical cassette housing an optical isolator;

a third optical cassette housing a second amplifier stage which includes a second length of a gain medium;

the first, second, and third optical cassettes being stacked in a vertical array such that at least one internal channel is formed through the first, second, and third cassettes when assembled in the vertical array and the first, second, and third cassettes each include an optical interconnection path which is routed through said internal channel.

11. A modular optical amplifier as recited in claim 10 wherein the first and second lengths of optical gain media are rare-earth doped optical fibers.

12. A modular optical amplifier as recited in claim 10 wherein the second optical cassette includes an add-drop multiplexer for removing and inserting an optical service channel.

13. A modular fiber optic cassette system comprising:

a first fiber optic cassette having a horizontal base and generally vertically projecting sidewalls, at least one sidewall being provided with a channel which intersects a through-hole in the horizontal base of the first cassette;

a second fiber optic cassette having a horizontal base and generally vertically projecting sidewalls, at least one sidewall being provided with a channel which intersects a through-hole in the horizontal base of the second cassette;

the first and second fiber optic cassettes and the through-holes being configured such that the vertical assembly of the first and second cassettes provides an internal passage for receiving optical fiber passing between the first and second cassettes.

14. A modular fiber optic cassette system as recited in claim 13 wherein the cassette sidewalls define an interior surface for retaining optical fiber in conformance with an acceptable bend radius for the optical fiber.

15. A modular fiber optic cassette system as recited in claim 14 further including fiber-retaining projections engaged with the horizontal bases of the first and second cassettes.

16. A modular fiber optic cassette system as recited in claim 15 wherein the fiber retaining projections and the internal passage are configured such that bend radii greater than the minimum bend radius are imposed upon fiber passing from cassette to another cassette through the internal passage.

* * * * *